United States Patent
Pohl et al.

(10) Patent No.: US 6,929,739 B2
(45) Date of Patent: Aug. 16, 2005

(54) COOLING DEVICE

(75) Inventors: Patrik Pohl, Schwalbach (DE); Guiseppe Zeolla, Muralto (CH)

(73) Assignee: Hydac Fluidtechnik GmbH, Sulzbach/Saar (DE)

( * ) Notice: Subject to any disclaimer, the term of this patent is extended or adjusted under 35 U.S.C. 154(b) by 0 days.

(21) Appl. No.: 10/220,045

(22) PCT Filed: Feb. 15, 2001

(86) PCT No.: PCT/EP01/01684

§ 371 (c)(1),
(2), (4) Date: Dec. 20, 2002

(87) PCT Pub. No.: WO01/65123

PCT Pub. Date: Sep. 7, 2001

(65) Prior Publication Data

US 2003/0146147 A1 Aug. 7, 2003

(30) Foreign Application Priority Data

Mar. 1, 2000 (DE) .......................... 100 09 864

(51) Int. Cl.$^7$ .............................................. F15B 21/04
(52) U.S. Cl. .................... 210/90; 210/130; 210/181; 210/184; 165/119
(58) Field of Search .................. 210/90, 130, 181, 210/184; 184/6.22, 6.24; 165/119

(56) References Cited

U.S. PATENT DOCUMENTS

| | | | | |
|---|---|---|---|---|
| 2,596,589 A | * | 5/1952 | Nusbaum ..................... | 165/72 |
| 3,751,191 A | * | 8/1973 | Mott et al. .................. | 417/313 |
| 4,179,372 A | * | 12/1979 | Rosaen ....................... | 210/90 |
| 4,295,964 A | | 10/1981 | Preisler | |
| 5,159,821 A | | 11/1992 | Nakamura | |
| 5,336,396 A | * | 8/1994 | Shetley ...................... | 210/90 |
| 5,351,664 A | | 10/1994 | Rotter et al. | |
| 5,374,355 A | * | 12/1994 | Habiger et al. ............. | 210/440 |
| 6,105,660 A | * | 8/2000 | Knurr ......................... | 165/41 |

FOREIGN PATENT DOCUMENTS

| | | |
|---|---|---|
| CH | 533246 | 1/1973 |
| DE | 19635777 | 3/1998 |
| JP | 63054590 | 3/1988 |

* cited by examiner

*Primary Examiner*—Matthew O. Savage
(74) *Attorney, Agent, or Firm*—Roylance Abrams Berdo & Goodman, L.L.P.

(57) ABSTRACT

A cooling device includes a cooling unit (10) through which a fluid to be cooled, especially hydraulic oil, can flow and a filter unit (12) for filtering fluid. The cooling unit (10) and the filter unit (12) are joined together as one piece. The filter unit (12) is placed together with the cooling unit (10) inside a device housing (14). The cooling device can be constructed in a manner that is considerably more compact and lighter, while having an output that is comparable to that of prior art solutions.

12 Claims, 2 Drawing Sheets

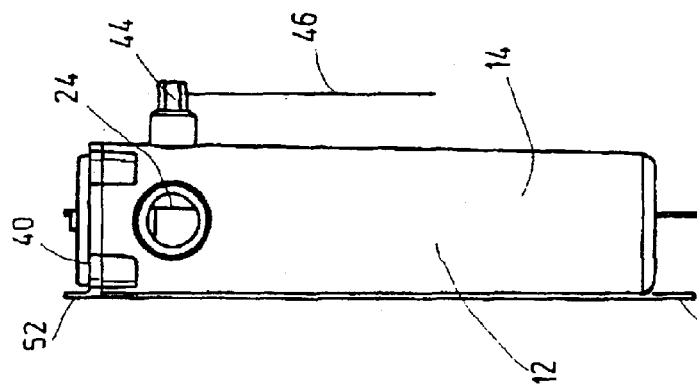
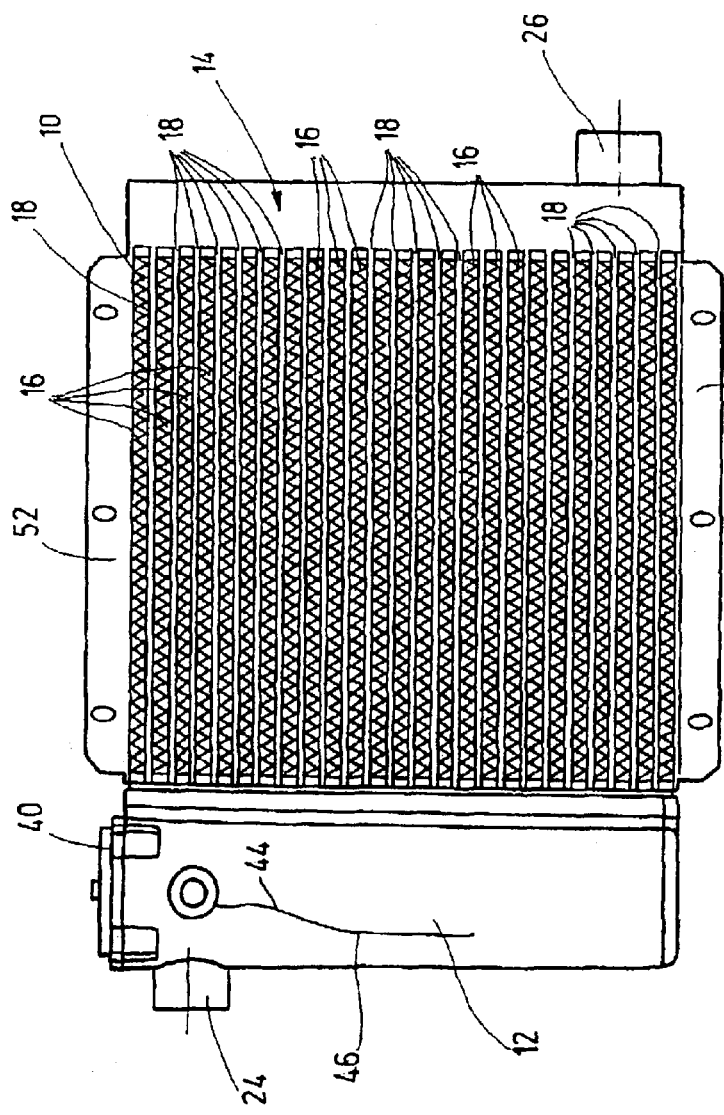
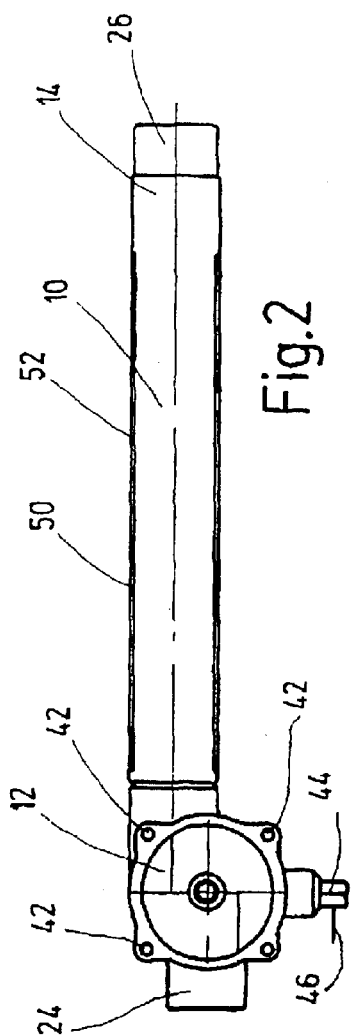

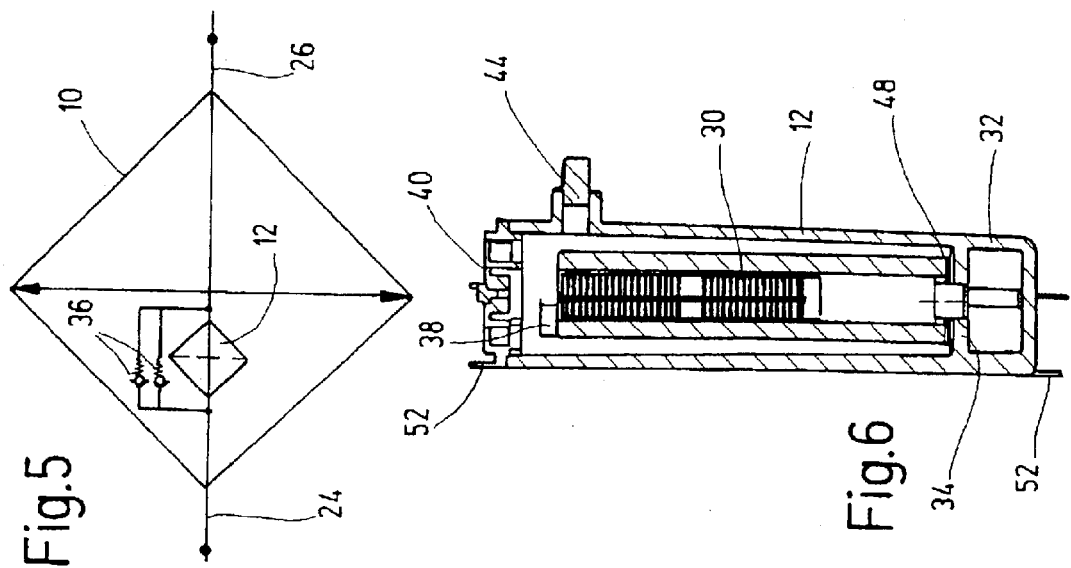
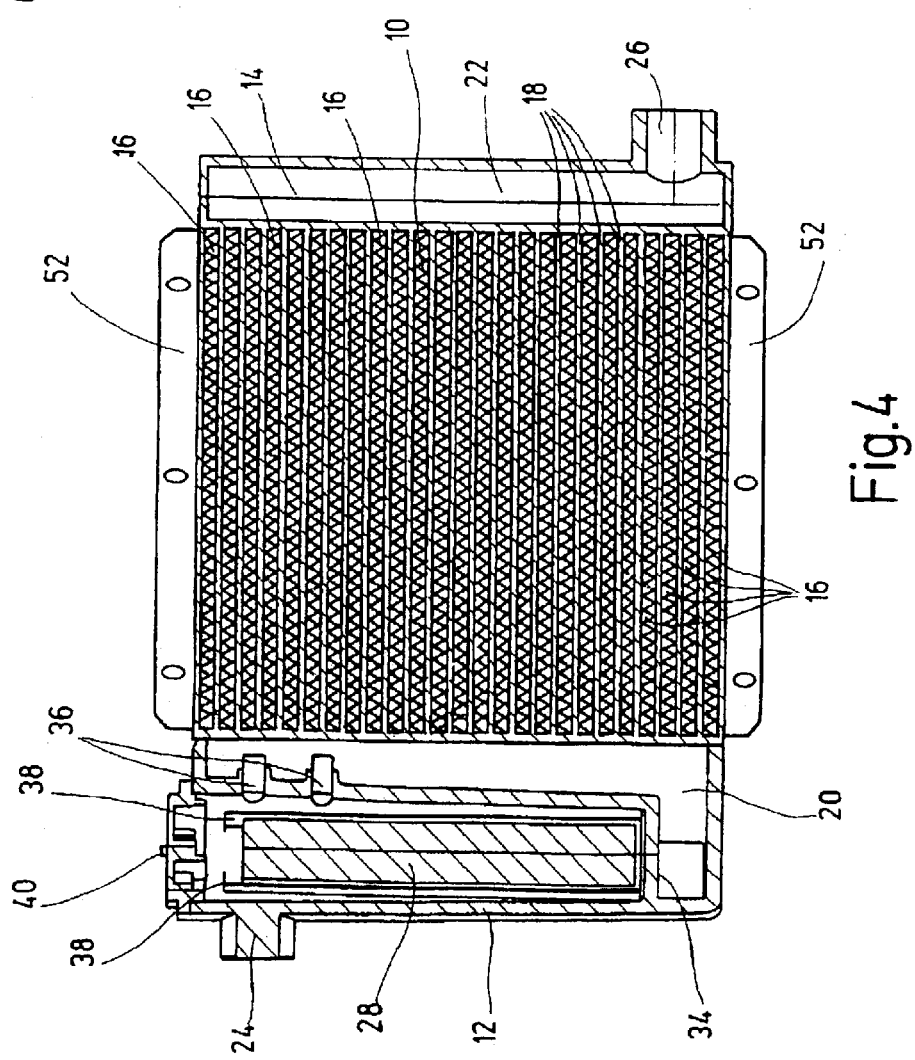

COOLING DEVICE

FIELD OF THE INVENTION

The present invention relates to a cooling device with a cooling unit through which flows a fluid to be cooled, especially hydraulic oil, and with a filter unit for filtration of the fluid.

BACKGROUND OF THE INVENTION

Cooling devices of the type in question can be used for a plurality of applications and are available in the most varied of embodiments. The cooling device systems readily available on the market to date however all have a filter unit flanged to the cooling unit or to tank units connected to cooling units, the respective tank unit then holding the filter element. Thus, conventional cooling devices are generally composed of several components. The independent cooling unit can be connected by corresponding tubing to the independent actual filter unit in producing the cooling device with one another. Faulty connections and fault sources arise in the installation of conventional cooling devices with the indicated tubing. Furthermore, conventional cooling devices are structurally large due to the diversity of their parts, and are accordingly heavy. Such structure is disadvantageous especially for mobile use.

SUMMARY OF THE INVENTION

Objects of the present invention are to provide improved cooling devices that are compact and light in construction, and avoid possible fault sources in installation.

According to the present invention, the cooling unit and the filter unit are connected in one piece to one another. Because the filter unit together with the cooling unit is located in the housing of the device, the conventional multi-part structure is avoided and the cooling device of the present invention can be manufactured in a manner that is considerably more compact and lighter, while still achieving the same performance capacity. Furthermore, by integrating the cooling unit and the filter unit in the device housing, the conventional tubing can be omitted and fault sources are precluded in this way.

In one preferred embodiment of the cooling device of the present invention, the filter unit, in the flow direction of the fluid, is located upstream or downstream from the cooling unit and the cooling unit is designed as a plate-shaped finned cooler. Especially for installation spaces that are kept flat, the plate configuration of this type is advantageous. By selective arrangement of the filter unit in the right or left water box of the cooling unit, it is possible to interchange the sequence of cooling unit and filter unit with one another. This selectivity allows extensive matching of the cooling device to the installation conditions on site. Preferably, the device housing is composed of sheet metal parts. However, an embodiment formed as a casting is especially preferred, particularly as an aluminum diecasting.

In another preferred embodiment of the cooling device of the present invention, the filter unit is made cylindrical. Fluid supply into the device housing takes place in the upper area of the filter unit. The fluid drains from the cooling unit in its lower area. A favorable flow-through behavior for the fluid can be achieved by the arrangement of fluid feed and drainage of this type.

In another especially preferred embodiment of the cooling device of the present invention, the filter element is held in a filter housing, which filter housing is an integral part of the device housing. The filter housing can be matched to the outside contour of the filter element so that for this element, even in the outside peripheral area, reliable support and guidance within the device housing are guaranteed. Preferably, in the filter housing at least two bypass valves are provided which respond at different volumetric flows. Thus, for example, improved matching to variable volumetric flows from 60 l to 160 l can be achieved, with the result that a cooling device can be used in a wide range of applications with different orders of magnitude of fluid volumetric flows without structural changes being necessary here.

For an especially environmentally friendly device, the filter element can be formed from materials which can be completely incinerated. Thus, disposal without residue is for the most part achieved.

To improve the refrigerating capacity the cooling unit, especially its front side, a motor-fan unit is connected and increases the possible air throughput in the finned cooler. This fan leads to improved cooling results.

In another preferred embodiment of the cooling device of the present invention the filter housing can be sealed by a sealing cover. On the filter housing, a connection point is provided for a fouling indicator. The fouling indicator can show the degree of fouling of the filter element. In the clogged state, the fouled filter element should be replaced by a new one. A replacement of this nature takes place with ease of installation and promptly by the upper sealing cover on the filter housing. For stationary and mobile installations of the cooling device, fixing parts allow a detachable connection to stationary components on machines and devices as well as on vehicles.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a front elevational view of a cooling device without a motor-fan unit according to a first embodiment of the present invention;

FIG. 2 is a top plan view of the cooling device of FIG. 1;

FIG. 3 is a side elevational view of the cooling device of FIG. 1;

FIG. 4 is a front elevational view partially in section of the cooling device of FIG. 1;

FIG. 5 is an operating diagram of the cooling device of FIG. 1; and

FIG. 6 is a side elevational view in section of a cooling device according to a second embodiment of the present invention, to the extent it differs from the first embodiment.

DETAILED DESCRIPTION OF THE INVENTION

The cooling device has a cooling unit 10 through which a fluid to be cooled, especially hydraulic oil, can flow and a filter unit 12 for filtration of that fluid. As shown especially by FIGS. 1 and 2 and FIG. 4, the cooling unit 10 and the filter unit 12 are connected in one piece to one another. The filter unit 12 together with the cooling unit 10 are located in the device housing 14. According to the two embodiments shown in the drawings, the filter unit 12 is located, in the flow direction of the fluid, upstream from the cooling unit 10. The filter unit 12, however, can also be located, according to one embodiment of the cooling device of the present invention (not shown), in the flow direction of the fluid downstream from the cooling unit 10 and connected to it in one piece within the device housing 14.

Furthermore, as shown in FIGS. 1 and 4, the cooling unit 10 is constructed as a plate-shaped finned cooler. To route or convey the cool air, the plate cooler housing 16 folded out in a zigzag shape. Between the fins, border fluid guide channels 18 transport the fluid to be cooled. The air guidance direction by the cooling unit 10 extends perpendicularly to the plane of FIGS. 1 and 4, with the fluid transport direction being transversely thereto and therefore in the plane of the Figure. Furthermore, the fluid guide channels 18 are located on top of one another, and discharge on both sides into first and second fluid collecting spaces 20, 22. The structure of the finned cooler of the type in question is generally conventional so that it is not detailed here. The device housing 14 itself in this embodiment is made as an aluminum casting; but it can also be assembled from sheet metal parts in a box shape and assembled into a housing by way of welds.

The filter unit 12 is cylindrical. Fluid supply 24 into a first housing part of the device housing 14 takes place in the upper edge area of the filter unit 12. The fluid drain 26 out of the cooling unit 10 takes place in a lower area of a second housing part of the device housing by way of the fluid collecting space 22. As seen in FIGS. 1 and 4, the rough flow-through direction is from top left to bottom right. The actual filter element 28 comprises conventional filtration materials, for example, a pleated, hollow-cylindrical filter mat surrounding a middle support pipe 30, and is held in a filter chamber of the filter housing 32 formed as an integral component of the first housing part of the device housing 14, especially in the form of a casting. As shown in FIG. 4, a partition wall is adjacent to and separates the filter chamber from the first collecting space 20. The replaceable filter element 28 filters dirt out of the fluid supplied by the fluid supply 24. By filtering dirt out of the fluid by the filter element 28, cleaned fluid is then conveyed through the cooling unit 10 and cannot form deposits therein which could jeopardize operation of the entire cooling device.

In the embodiment as shown in FIG. 4, the partition wall of filter housing 32 towards the cooling unit 10 borders the fluid collecting space 20, and in cross section is essentially L-shaped, like the bordering area of the fluid collecting space 20. Space 20 extends, like the fluid collecting space 22, over or along the entire height of the entire device and the cooling unit 10. The actual filter element 28 stands or rests on the bottom 34 of the integrated filter housing 32. The bottom has a middle flow-through recess shown in FIG. 4 providing a fluid-guiding connection between the interior of the filter element 28 and the fluid collecting space 20. Furthermore, the fouled fluid flows through the filter element 28 from the outside to the inside. The fluid cleaned in this way is relayed by the through-opening in the bottom 34 of the partition wall and the fluid collecting space 20 to the cooling unit 10. To be able to ensure undisrupted filtration, the filter element 28 is encompassed by the filter housing 32 with a radial distance so that the filter element 28 can be peripherally flushed by the fouled fluid applied to the device by the fluid supply 24.

As seen in FIG. 4, in the upper area of the filter housing 32 and diametrically opposite the fluid supply 24 in the wall of the filter housing 32, on top of one another, two bypass valves 36 are provided with opening and closing characteristics corresponding to one another. The bypass valves 36 ensure that when the filter element 28 is completely clogged, the cooling operation is not interrupted, acting as a sort of emergency supply, as before the supply of the cooling unit 10 with the fluid to be cooled. By using the two bypass valves 36, a larger range of volumetric flow quantities can be covered with only one cooling device, for example the range from 60 l to 160 l. At low volumetric flows, only one bypass valve 36 responds. In other applications with higher volumetric flow, two bypass valves 35 are necessary if the filter element 28 is completely clogged.

The filter element 28, on its top, discharges into two holding grooves 38 which facilitate removal of the filter element 28 by hand. The filter element 28 preferably comprises materials which can be completely incinerated, so that the clogged and used filter element 28 can be disposed of almost free of residue. For effective cooling operation, the front side of the cooling unit 10 is connected to a motor-fan unit (not shown) used to guide the air flow by the cooling fins 16 to cool down the heated fluid in the fluid guide channels 18 to a definable value. In the area of concrete pumps where these cooling devices are used, the fluid is cooled, for example, from 80° C. to 60° C. On its top, the filter housing 32 can be sealed by the sealing cover 40 fixed by a screw connection 42 on the upper opening edge of the cylindrical filter housing 32.

A connection point 44 for the fouling indicator (not shown) is at a right angle and in the same reference plane next to the fluid supply 24 in the filter housing 32. The fouling indicator can be connected to the connection point 44, for example, by an electrical connecting cable 46, allowing determination of the degree of fouling of the filter element 28. In the embodiment shown in FIG. 6, the support tube or pipe 30 is made modular by individual plastic support tube segments. On the bottom 34, the filter element 28 is routed in an element receptacle 48 of the filter housing 32.

As especially shown by the plan view in FIG. 2, both the cooling unit 10 and the cylindrical filter unit 12 on their back side 50 essentially terminate in a common plane. Perpendicular to that common plane is the connection site 44 for the fouling indicator on the filter housing 32. The fluid supply 24 and the fluid drain 26 lie in turn in a common plane parallel to the back side 50 of the common termination wall. On the free front sides at the top and bottom on the cooling unit 10, a bridge-like fastening part 52 is provided to fix the cooling device on stationary components or in a mobile application, for example, by a screw connection which is not detailed.

By virtue of the fact that, as indicated, the filter pot or housing with the filter element 28 is an integral component of the cooler in the form of the cooling unit 10, a compact and light construction is achieved. As a result of the internal fluid routing by the fluid collecting spaces 20 and the fluid guide channels 18, complex tubing is for the most part avoided and fault sources in installation and maintenance of the cooling device are precluded. As a result of the presence of multiple bypass valves 36, improved matching with variable volumetric flows, especially from 60 l to 160 l flow quantity, is achieved. The cooling device is environmentally friendly with respect to optimum recycling capacity. Since the filter unit 12 in the flow direction of the fluid to be cooled is located upstream from the plate-shaped finned cooler 10 and because the filter unit 12 extends along the side wall of the finned cooler 10 which is kept free of the fins of the cooler itself, a cooling device is formed which is made plate-shaped, which has a very compact structure, which requires less installation space, and which still ensures a very large amount of refrigeration capacity. Furthermore, in the arrangement of the present invention, the fouled fluid is prevented from clogging the fluid-carrying fins within the plate cooler.

While various embodiments have been chosen to illustrate the invention, it will be understood by those skilled in the art that various changes and modifications can be made therein without departing from the scope of the invention as defined in the appended claims.

What is claimed is:

1. A cooling device, comprising:
   a cooling unit having horizontally extending fluid guide channels with fins extending between said guide channels, said guide channels having first and second ends;
   a first housing part formed as part of said cooling unit, and having a first collecting space adjacent said first ends of said guide channels, a filter chamber located therein, a partition wall within the first housing part adjacent to and separating the first collecting space from the filter chamber, and a through-opening extending through said partition wall;
   a second housing part formed as a part of said cooling unit and having a second collecting space adjacent said second ends of said guide channels;
   an outlet extending from said second housing part and opening into said second collecting space;
   an inlet extending from said first housing part and opening into said filter chamber; and
   a filter element mounted within said filter chamber and sealed to said through-opening;
   whereby unfiltered fluid flows through said inlet and into said filter chamber, through said filter element, out said through-opening and into said first collecting space, through said first ends into and through said fluid guide channels, through said second ends into said second collecting space, and out said outlet.

2. A cooling device according to claim 1 wherein said cooling unit is a plate shaped finned cooler.

3. A cooling device according to claim 1 wherein said housing parts are formed of sheet metal.

4. A cooling device according to claim 1 wherein said housing parts are castings.

5. A cooling device according to claim 1 wherein said filter chamber is cylindrical;
   said inlet opens in an upper portion of said filter chamber; and
   said outlet opens in a lower portion of said second collecting space.

6. A cooling device according to claim 1 wherein said filter chamber is integral with said first housing part.

7. A cooling device according to claim 1, wherein at least two bypass valves are between said filter chamber and said first collecting space, said valves responding to different volumetric flows.

8. A cooling device according to claim 1 wherein said filter element is formed of incineratable material and conducts fluid from outside to inside thereof.

9. A cooling device according to claim 1 wherein a motor-fan unit is connected to said cooling unit.

10. A cooling device according to claim 1 wherein said motor-fan unit is connected to a front side of said cooling unit.

11. A cooling device according to claim 1 wherein a sealing cover seats said filter chamber; and
    a connecting point for a fouling indicator is provided on said filter chamber.

12. A cooling device according to claim 1 wherein said filter chamber extends along said partition wall; and said partition wall is free of fins.

* * * * *